(12) United States Patent
Johnson et al.

(10) Patent No.: US 7,979,806 B2
(45) Date of Patent: Jul. 12, 2011

(54) UN-INTRUSIVE DISPLAY AREAS

(75) Inventors: Krista L. Johnson, Newcastle, WA (US); Garrett R. Vargas, Sammamish, WA (US); Robert Ian Oliver, Issaquah, WA (US); Bradley L. Carpenter, Carnation, WA (US); Daniel Makoski, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 188 days.

(21) Appl. No.: 11/611,541

(22) Filed: Dec. 15, 2006

(65) Prior Publication Data

US 2008/0148173 A1    Jun. 19, 2008

(51) Int. Cl.
*G06F 3/048*    (2006.01)
(52) U.S. Cl. ........ 715/779; 715/790; 715/794; 715/797; 715/808

(58) Field of Classification Search .................. 715/779, 715/797, 790, 794, 808
See application file for complete search history.

(56) References Cited

U.S. PATENT DOCUMENTS

| | | | | |
|---|---|---|---|---|
| 5,568,598 | A * | 10/1996 | Mack et al. | 345/639 |
| 5,675,358 | A * | 10/1997 | Bullock et al. | 345/420 |
| 7,039,872 | B1 * | 5/2006 | Raheman | 715/748 |
| 7,536,650 | B1 * | 5/2009 | Robertson et al. | 715/767 |
| 7,657,845 | B2 * | 2/2010 | Drucker et al. | 715/833 |
| 2002/0116257 | A1 * | 8/2002 | Helbig | 705/14 |
| 2004/0143598 | A1 * | 7/2004 | Drucker et al. | 707/104.1 |
| 2004/0172593 | A1 * | 9/2004 | Wong et al. | 715/512 |
| 2007/0226255 | A1 * | 9/2007 | Anderson | 707/104.1 |

* cited by examiner

*Primary Examiner* — Boris Pesin
*Assistant Examiner* — Andres E Gutierrez

(57) ABSTRACT

A method and user interface permits the display of objects in a portion of a display. The objects may initial be a first size, then shrink to a smaller size after a period of time. The objects may stack on top of each other. In addition, the objects may disappear all together after a further amount of time.

16 Claims, 5 Drawing Sheets

UN-INTRUSIVE DISPLAY AREAS

BACKGROUND

As the popularity of computers has risen, computers displays are seen as a viable venue to display advertisements. However, not everyone can afford a computer and it may not be practical to carry a computer to every location that a computer may useful. One idea is to subsidize the cost of a computer by displaying additional information to a user such as an advertisements. However, many users see this additional information as being intrusive but the providers of additional information want as much attention as they can reasonably obtain. What is needed is a type of additional information that is effective enough such that information providers receive sufficient attention but the additional information is not so intrusive as to annoy users and drive them away.

SUMMARY

A method of displaying objects on a display is disclosed. A first display of a particular object may be displayed. After a period of time, the first display may shrink to a smaller size and the display may still indicate that it is related to the particular object. After some time, second display of another particular object may be displayed and the second display may be stacked above the shrunken first display. After another period of time, the second display may shrink to a smaller size but still be stacked above the shrunken first display. After yet another period of time, the first shrunken display may slide off the display and the shrunken second display may slide into the place of the shrunken first display and other display may be displayed over the shrunken second display. At any time, the various displays may be selected and additional information about the display may be obtained by selecting the display. The additional information may be a link to another web set, a new window or simply additional information being displayed.

SPECIFICATION

Although the following text sets forth a detailed description of numerous different embodiments, it should be understood that the legal scope of the description is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. §112, sixth paragraph.

Figure 1:
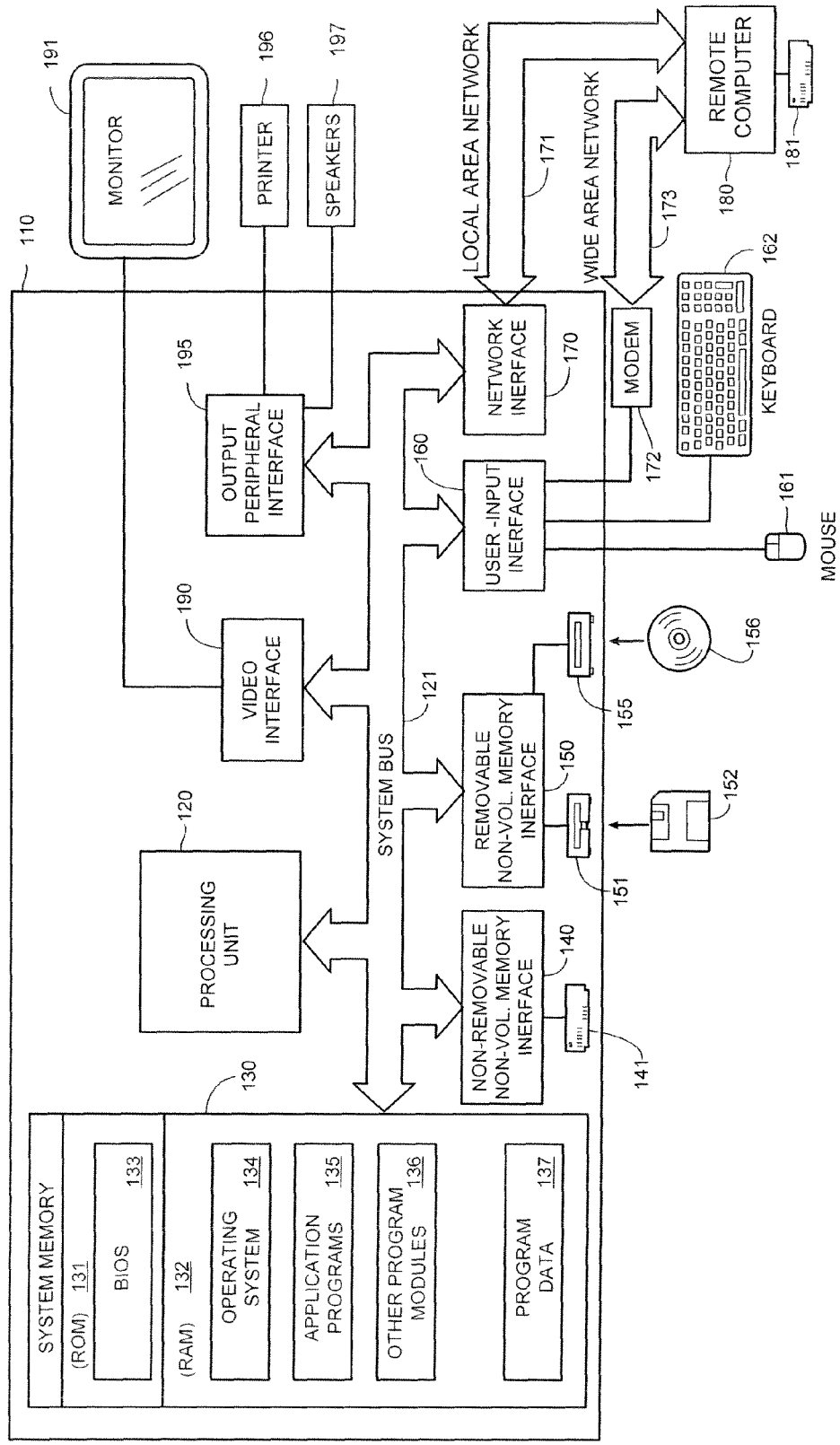
FIG. 1 is an illustration of a computing device which displays the display objects.

FIG. 1 illustrates an example of a suitable computing system environment 100 that may operate to display and provide the user interface described by this specification. It should be noted that the computing system environment 100 is only one example of a suitable computing environment and is not intended to suggest any limitation as to the scope of use or functionality of the method and apparatus of the claims. Neither should the computing environment 100 be interpreted as having any dependency or requirement relating to any one component or combination of components illustrated in the exemplary operating environment 100.

With reference to FIG. 1, an exemplary system for implementing the blocks of the claimed method and apparatus includes a general purpose computing device in the form of a computer 110. Components of computer 110 may include, but are not limited to, a processing unit 120, a system memory 130, and a system bus 121 that couples various system components including the system memory to the processing unit 120.

The computer 110 may operate in a networked environment using logical connections to one or more remote computers, such as a remote computer 180, via a local area network (LAN) 171 and/or a wide area network (WAN) 173 via a modem 172 or other network interface 170.

Computer 110 typically includes a variety of computer readable media that may be any available media that may be accessed by computer 110 and includes both volatile and nonvolatile media, removable and non-removable media. The system memory 130 includes computer storage media in the form of volatile and/or nonvolatile memory such as read only memory (ROM) 131 and random access memory (RAM) 132. The ROM may include a basic input/output system 133 (BIOS). RAM 132 typically contains data and/or program modules that include operating system 134, application programs 135, other program modules 136, and program data 137. The computer 110 may also include other removable/non-removable, volatile/nonvolatile computer storage media such as a hard disk drive 141 a magnetic disk drive 151 that reads from or writes to a magnetic disk 152, and an optical disk drive 155 that reads from or writes to an optical disk 156. The hard disk drive 141, 151, and 155 may interface with system bus 121 via interfaces 140, 150.

A user may enter commands and information into the computer 20 through input devices such as a keyboard 162 and pointing device 161, commonly referred to as a mouse, trackball or touch pad. Other input devices (not illustrated) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device may also be connected to the system bus 121 via an interface, such as a video interface 190. In addition to the monitor 191, computers may also include other peripheral output devices such as speakers 197 and printer 196, which may be connected through an output peripheral interface 190.

Figure 2:
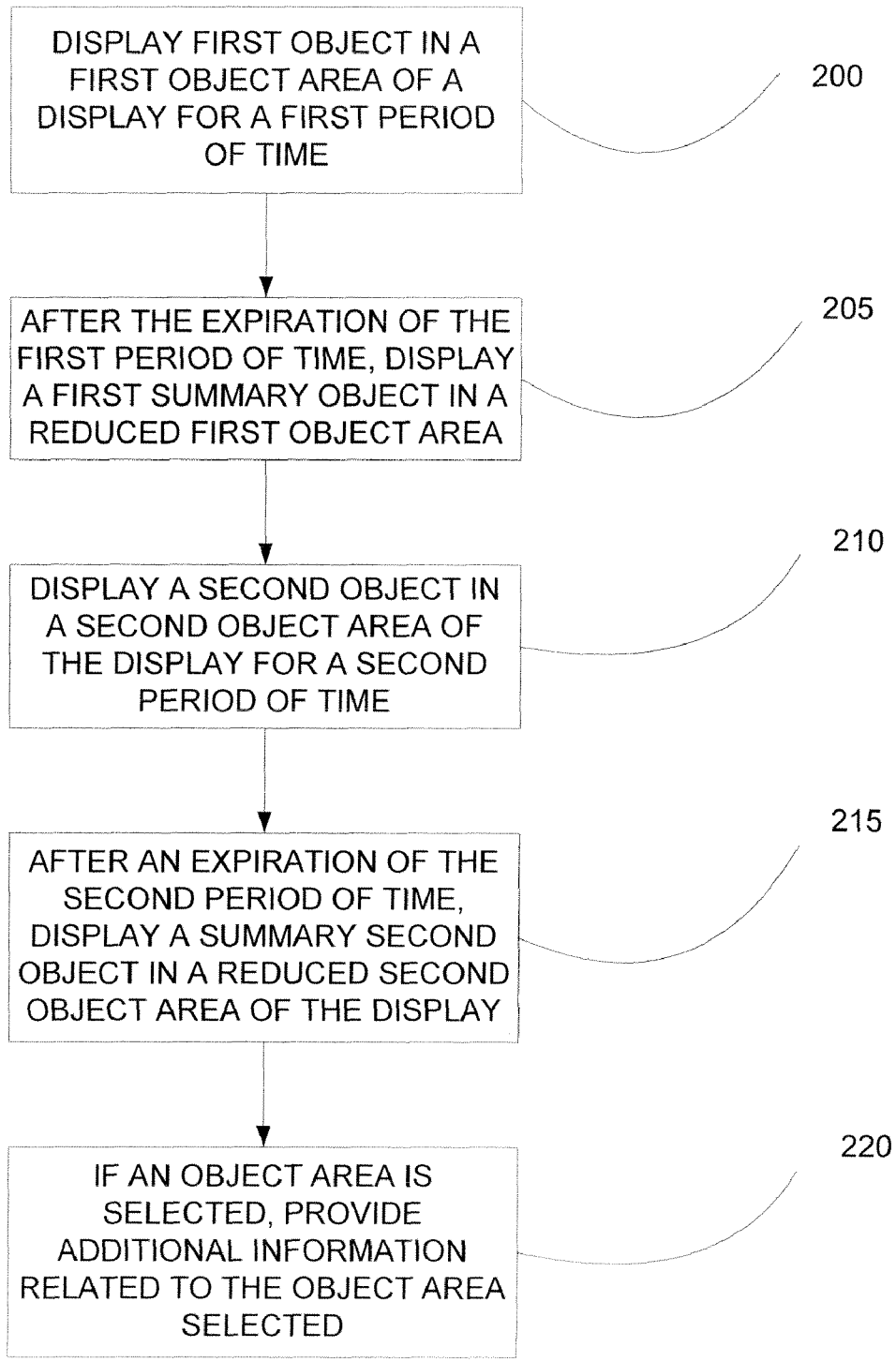
FIG. 2 is an illustration of a flowchart of a method of displaying objects.

FIG. 2 may be an illustration of a flowchart of a method of un-intrusively displaying an object on a display. The display 191 may be a computer display 191 but may be any monitor such as a television monitor, a portable media device display, a watch, a billboard, etc. At block 200, a first object may be displayed in a first object area of a display 191 for a first period of time.

Figure 3:
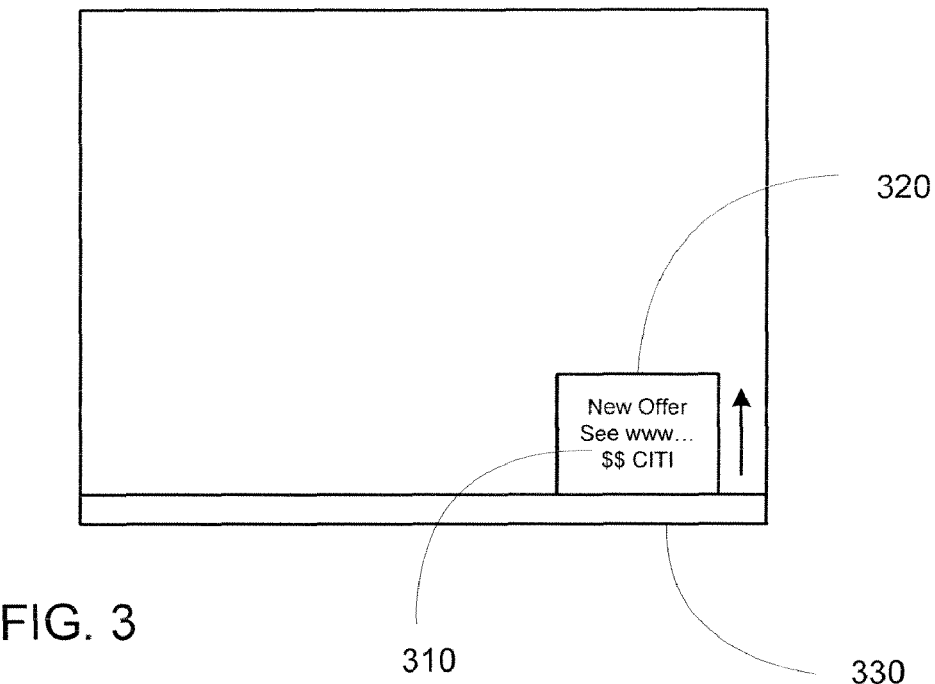
FIG. 3 is an illustration of a sample display of a first object in a first object area.

FIG. 3 may be an illustration of a display of a first object 310 inside a first object area 320. The first object 310 and all the objects described herein may be text, illustrations, photos, movies, animations, videos or any media object that may be visually communicative. In addition, the first object 310 and the other objects may be combination of objects such as movies and text. The first object area 320 may any shape such as a rectangle. It may be made visually interesting through highlighting, shadowing, etc.

The first object area 320 may be displayed in a variety of manners. In one embodiment, the first object area 320 may slowly rise from the bottom of the display 330 like toast from a toaster. In this way, the first object area 320 may be presented in such a way not to startle a user. Other manners of displaying the first object area 320 are certainly possible. For example, in another embodiment, the first object area 320 may slowly appear such as when the first object area 320 appears as behind a translucent layer that is slowly removed until the first object area 320 is plainly visible.

The first period of time may be virtually any period of time. The first period of time may be a consistent period of time, such as every twenty seconds. In another embodiment, the first period of time may be variable. For example, if the first object 310 is an advertisement, the advertiser may pay more to have that advertisement displayed for a longer period of time. In yet another embodiment, the first period of time may be random within a given range of possible times. In this way, a user may not become bored with the consistent display of objects and the objects may appear more interesting. In yet another embodiment, the first period of display may be related to the first object. If the first object 310 is a significant amount of text, the first period of time may be longer thereby making it easier for a user to read all the text. However, if the first object 310 is a known symbol such as the Microsoft Windows® trademark of a four colored flag, then this object may be displayed for a shorter period of time as less time is needed to recognize and process this object. Certainly, other first times are available.

Figure 4:
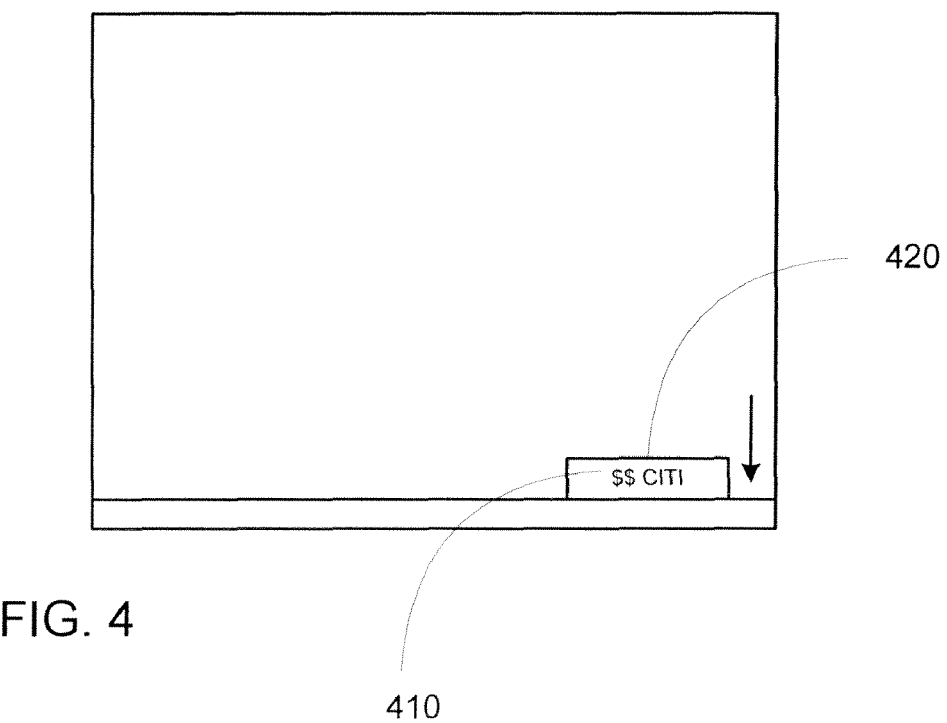
FIG. 4 is an illustration of a sample display of a summary first object in a reduced first object area.

Referring again to FIG. 2, at block 205, after the expiration of the first period of time, the method may display a first summary object 410 in a reduced first object area 420. FIG. 4 may be an illustration of one embodiment of the reduced first object area 420. In this embodiment, the first object area 320 reduces its height to become the reduced first object area 420, keeping its width the same. The transition from the first object area 320 to the reduced first object area 420 may be a smooth one, such as the first object area may shrink at a consistent speed until it reaches the desired size of the reduced first object area 420. In another embodiment, the transition may be faster, which may be more eye catching but may be more distracting. In yet another embodiment, the transition uses a translucent layer to slowly switch from displaying the first object area 320 to the reduced first object area 420. Of course, other embodiments are possible.

Inside the reduced first object area 420 is the summary first object 410. As the name implies, the summary first object 410 may be a summary of the first object 310. In one embodiment, the first summary object may be a heading related to the first object. For example, if the first object 310 is an advertisement for Microsoft Windows®, the first object 310 may contain the familiar Windows® graphic and some related text. The summary first object 410 may be just text. The summary first object 410 may be limited by the size of the reduced first object area 420. For example, an entire paragraph that may fit in the first object area 320 may be too small to be legible if it is forced to fit inside the reduced first object area 420. Similar to the first object 310, the summary first object 410 may be any text, illustrations, photos, movies, animations, videos or any media object that may be visually communicative and still be legible inside the reduced first object area 420.

Figure 5:
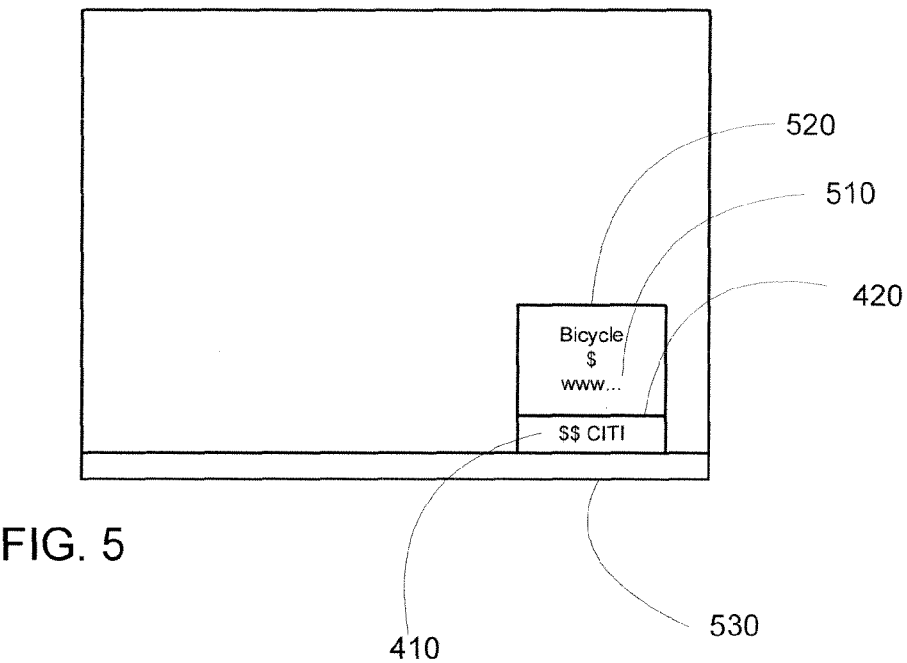
FIG. 5 is an illustration of a sample display of a summary first object in a reduced first object area and a second object in a second object area.

Referring again to FIG. 2, at block 210, a second object may be displayed in a second object area of the display for a second period of time. FIG. 5 may be an illustration of a second object 510 being displayed inside a second object area 520. The second object area 520 of the display may be stacked above the reduced first object area 420 of the display. For example, in one embodiment, the width of the second object area 520 may be the same as the width of the reduced first object area 420 but the height may be similar to the height of the first object area 320. As a result, the second object 510 may obtain the desired attention but may be un-intrusive enough to not annoy a user. In other embodiment, the width of the second object area 520 may be different than the width of the reduced first object area 320 such that additional attention may be obtained. Similarly, the height of the second object area 520 may be different than the height of the first object area 320.

Similar to the first object area 320, the second object area 520 may be displayed in a variety of manners. In one embodiment, the second object area 320 may slowly rise from the bottom of the display 530 like toast from a toaster. In this way, the second object area 520 may be presented in such a way not to startle a user. Other manners of displaying the second object area 520 are certainly possible. For example, an another embodiment, the second object area 520 may slowly appear such as when the second object area 520 appears as behind a translucent layer that is slowly removed until the second object area 520 is plainly visible.

Figure 6:
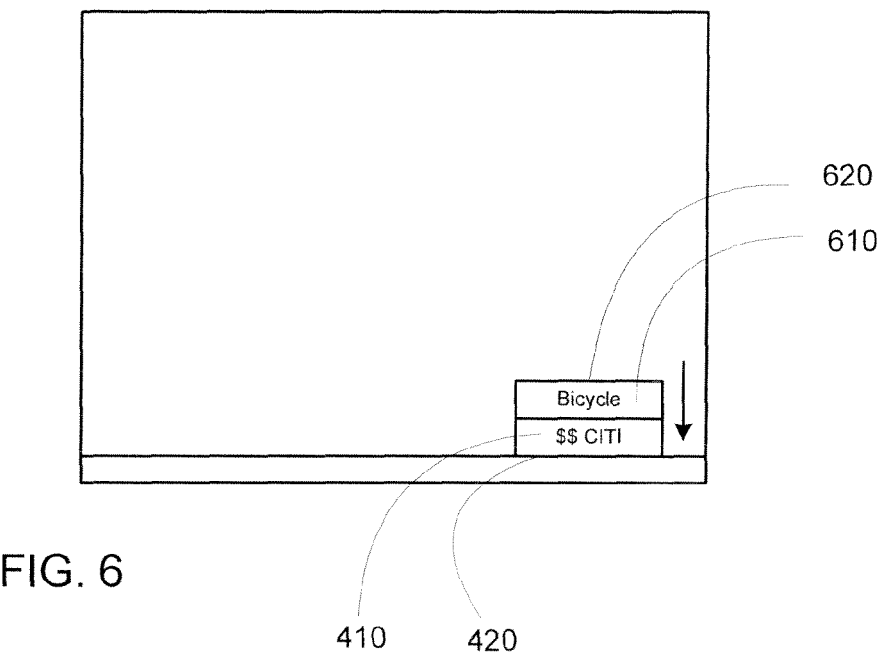
FIG. 6 is an illustration of a sample display of a summary first object in a reduced first object area and a shrunken second object inside a reduced second object area.

Referring again to FIG. 2, at block 215, after an expiration of the second period of time, a summary second object may be displayed in a reduced second object area of the display. FIG. 6 may be an illustration of the second summary object 610 being displayed inside a reduced second object area 620. The second period of time may be virtually any period of time. The second period of time may be a consistent period of time, such as every twenty seconds. In another embodiment, the second period of time may be variable. For example, if the second object 510 is an advertisement, the advertiser may pay more to have that advertisement displayed for a longer period of time. In yet another embodiment, the second period of time may be random within a given range of possible times. In this way, a user may not become bored with the consistent display of objects and the objects may appear more interesting. In yet another embodiment, the second period of display may be related to the second object 610. If the second object 610 is a significant amount of text, the second period of time may be longer thereby making it easier for a user to read all the text. However, if the second object 610 is a know symbol such as the Microsoft Windows® trademark of a four colored flag, then this object may be displayed for a shorter period of time as less time is needed to recognize and process this object. Certainly, other second times are available. Also, the second period of time and the first period of time may be the same or may be different.

In one embodiment, the second object area 520 reduces its height to become the reduced second object area 620, keeping its width the same. The transition from the second object area 520 to the reduced second object area 610 may be a smooth one, such as the second object area 520 may shrink at a consistent speed until it reaches the desired size of the reduced second object area 620. In another embodiment, the transition may be faster, which may be more eye catching but may be more distracting. In yet another embodiment, the transition may use a translucent layer to slowly switch from displaying the second object area 520 to the reduced second object area 620. Of course, other embodiments are possible.

Inside the reduced second object area 610 may be the summary second object 620. As the name implies, the summary second object 620 may be a summary of the second object 510. In one embodiment, the second summary object 610 may be a heading related to the second object 510. For example, if the second object 510 is an advertisement for Microsoft Windows®, the second object 510 may contain the familiar Windows® graphic and some related text. The summary second object 610 may be just text. The summary second object 610 may be limited by the size of the reduced second object area 620. For example, an entire paragraph that may fit in the second object area 520 may be too small to be legible if it is forced to fit inside the reduced second object area 620. Similar to the second object 510, the summary second object 610 may be any text, illustrations, photos, movies, animations, videos or any media object that may be visually communicative and still be legible inside the reduced second object area 620.

In another embodiment, the size of the first object area, the reduced first object area, the second object area and the reduced second object area may be related to the willingness of the party wishing to display information to the user. For example, the more a party is willing to pay, the larger the area may be. Of course, there are limits to the size as it may not be desirable to sell the entire display as that may be too intrusive and may drive users away. An auction type service may be used where parties may be able to submit bids to obtain object areas of different size.

In addition, various other factors may go into the size of the various object areas. The objects inside the various object areas may be tailored to the user and if a particular user is searching for information related to a particular advertiser, the object area may be larger. In addition, the usage level of the computer may affect the size of the object areas. For example, if a time is identified as a high demand time, a user may be more willing to accept a larger object area.

Referring again to FIG. 2, at block 220, if the first object area 320, reduced first object area 420, second object area 520 or reduced second object area 620 are selected, additional information may be provided related to the object area selected. Selection may occur in a variety of ways, from simply hovering to explicitly selecting an area with a mouse click. In one embodiment, providing further information may entail opening a new window using a link that is part of the selected object area. In another embodiment, addition information is displayed related to the selected object area in the current window of the display 191. In yet another embodiment, additional information is displayed by linking to a web site related to the selected object area. If a reduced object area 420, 620 is selected, the object area may expand to a non-reduced object area 320, 520. For example if reduced object area 420 is selected, it may expand into the non-reduced object area 320 and may push the reduced object area 620 up, on top of the non-reduced object area 320. Of course, there are many ways to display additional information when a selection is made and these many methods may easily be applied.

Figure 7:
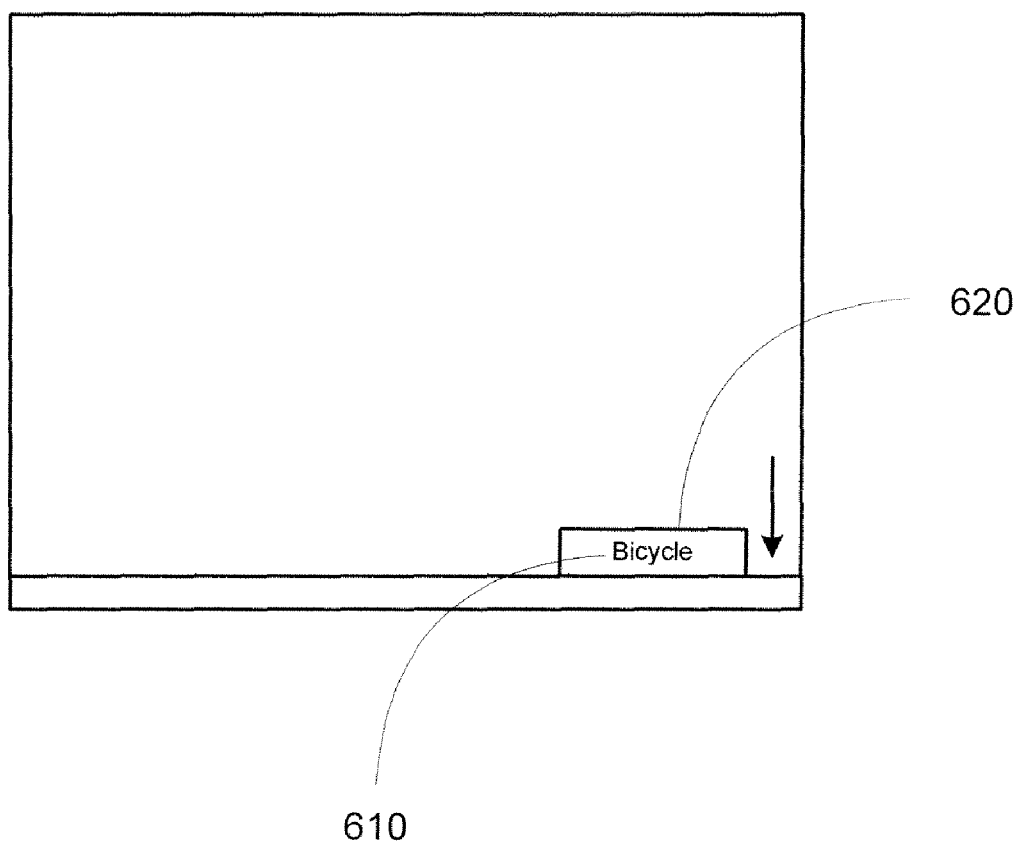
FIG. 7 is an illustration of a sample display of a summary second object in a reduced second object area.

In a further embodiment, the reduced first object area 420 may be displayed for a third period of time and, after the expiration of the third period of time, the second reduced object area 620 may be slid to be displayed over where the reduced first object area 420 was displayed. In effect, the reduced first object area 420 may be removed and the reduced second object area 620 may be displayed in its place. FIG. 7 is an illustration of a display after the reduced first object area 420 has been removed and the reduced second object area 620 has slid down into its place.

The actual mechanics of how the reduced second object area 620 takes the place of the reduced first object area 420 may be accomplished in a variety of ways. For example, the summary first object may be removed from the reduced first object area, the summary second object 610 may be added to the reduced first object area 420 and the reduced second object area 620 may be removed. In another embodiment, the reduced second object area 620 may simply slide down to cover the reduced first object area 420. In yet another embodiment, the reduced first object area 420 and the reduced second object area 620 may both slide down, with the reduced first object area 420 sliding off the display 191 entirely and the reduced second object area 620 sliding into the position of the reduced first object area 420. Of course, other embodiments are possible. For example, a translucent layer may be used to temporarily darken the reduced first object area 420 and the reduced second object area 620 while the reduced first object area 420 is removed and the reduced second object are 620 takes its place and then the translucent layer may be removed.

In addition, after the reduced first object area 420 is removed and the reduced second object area 620 takes its place, the second object 610 may be though of as replacing the first object 410 and the steps of the method may be repeated with a new second object area 520 being displayed. Further, additional object areas are possible. It is not necessary to limit the display of object areas to two, but additional object windows can be stacked on top of the currently displayed object areas. Further, a user may be given the option to temporarily close one or more of the object areas for a period of time.

The method may be implemented in a user interface on virtually any display device 191. The method may be useful on a subsidized computer where users obtain or are permitted to use the computer for a reduced cost or no cost in exchange for allowing the display of the object display areas, which may display advertisements, for example. Sample environments may include airports or cyber cafes where users may appreciate the free use of a computer in exchange for viewing objects.

In addition, the method may easily be applied to providing other services that is displayed on a monitor 191 such as wireless internet access, wired internet access, television services, download services, software services, music services, etc. Virtually any display that users may desire to see would work as long as the user would be willing to exchange a reduced price for a service or product in exchange for viewing some objects which are displayed in an un-intrusive manner.

Further, other features of interest may be located near the object areas 320, 420, 520, 620 to draw attention to the object areas 320, 420, 520, 620. For example, a search feature may be located near the object areas 320, 420, 520, 620 to draw attention to the object areas 320, 420, 520, 620. The search feature may also be used to search for past objects that may have been seen but may have been removed as time progressed. Other features of interest may include scrolling news, weather, sport scores, celebrity news, comics, offers, sales, etc. The features may be related to the location of the monitor 191. For example, if the monitor 191 is in the airport, the other features of interest may be airport related such as flight delays, offers for miles transportation to and from the airport, near by hotels, etc. The features may be displayed in the object areas 320, 420, 520, 620 or near them.

In a specific example, in FIG. 3, a first object area 320 may appear containing a first object 310 which may be additional information about Citibank. After twenty seconds, the first object area 320 may shrink to the reduced first object area 420 (FIG. 4) which may contain the summary first object 410 which may simply be dollar signs and the phrase "Citi." In five seconds, a second object area 520 (FIG. 5) containing a second object 510 which may be additional information about a bicycle sale may appear stacked above the reduced first object area 420. After twenty more seconds, the second object area 520 may shrink into the reduced second object area 620 (FIG. 6) where the summary second object 610 may be displayed which may simply contain the phrase "Bicycle." After a third period of time, the first summary object 410 may be removed and the second summary object 610 may be displayed in the reduced first display area 420 (FIG. 7) and the reduced second display area 620 may be removed.

The invention claimed is:

1. A method of displaying objects on a display comprising:
   displaying a first object in a first object area of a display for a first period of time wherein the width of the first object area of the display is less than an entire width of the display;
   after an expiration of the first period of time, displaying a summary first object in a reduced first object area of the display wherein the width of the first object area and the reduced first object area is the same and wherein the area of the reduced first object area is at least 50% less than the area of the first object area;
   displaying a second object in a second object area of the display for a second period of time wherein the second object area of the display is stacked directly above and connected to the reduced first object area of the display;
   after an expiration of the second period of time, displaying a summary second object in a reduced second object area of the display wherein the reduced second object area of the display is stacked directly above and connected to the reduced first object area and wherein the width of the second object area and the reduced second object area is the same and wherein the area of the reduced second object area is at least 50% less than the area of the second object area;
   displaying the reduced first object area for a third period of time and after the expiration of the third period of time:
   removing the summary first object from the reduced first object area;
   adding the summary second object to the reduced first object area; and
   removing the reduced second object area; and
   if the first object area, reduced first object area, second object area or reduced second object area are selected, providing additional information related to the object area selected.

2. The method of claim 1, wherein the first summary object is a heading related to the first object.

3. The method of claim 1, wherein the second summary object is a heading related to the second object.

4. The method of claim 1, further comprising if the first reduced object area is selected, expanding it into the first non-reduced object area and moving the second reduced object area to be displayed above the first non-reduced object area.

5. The method of claim 1, wherein the width of the first object area, the reduced size first object area, the second object area, and the reduced size second object area is the same.

6. The method of claim 1, further comprising providing further information comprises opening a new window using a link in the selected object area.

7. The method of claim 1, further comprising providing further information comprises displaying addition information related to the selected object area.

8. The method of claim 1, further comprising providing further information comprises linking to a web site related to the selected object area.

9. The method of claim 1, wherein the first object, the summary first object, the second object and the summary second object are advertisements.

10. A non-transitory computer storage medium comprising computer executable instructions for creating a user interface for a computer comprising
   a first object area containing a first object wherein the first object area is displayed for a first period of time and wherein the width of the first object area of the display is less than an entire width of the display;
   a reduced first object area containing a summary first object that is displayed on the display after an expiration of the first period of time wherein the width of the first object area and the reduced first object area is the same and wherein the area of the reduced first object area is at least 50% less than the area of the first object area;
   a second object area containing a second object wherein the second object area is displayed for a second period of time and wherein the second object area is stacked directly above and connected to the reduced first object area;
   a reduced size second object area containing a summary second object displayed after an expiration of the second period of time wherein the reduced second object area of the display is stacked directly above and connected to the reduced first object area and wherein the width of the second object area and the reduced second object area is the same and wherein the area of the reduced second object area is at least 50% less than the area of the second object area;
   a third object area that is displayed after an expiration of a third period of time wherein the third object area:
      contains the second reduced object,
      eliminates the first reduced object area from the display; and
      is located in the same location as the first reduced object area; and
   an additional display of additional information if the first object area, reduced first object area, second object area or reduced second object area is selected, wherein the additional information is related to the object area selected.

11. The computer storage medium of claim 10, wherein the first summary object is a heading related to the first object and wherein the second summary object is a heading related to the second object.

12. The computer storage medium of claim 10, wherein the width of the first object area, the reduced size first object area, the second object area, the reduced size second object area and the third object area are the same.

13. The computer storage medium of claim 10, wherein the addition display comprises one selected from the group comprising:
   a new window that is opened using a link in the selected object area;
   a web site that is linked to that is related to the selected object area; and
   an additional display on the display behind the object areas.

14. A computer system comprising a processor for executing computer executable instructions, a memory for storing computer executable code and computer data, and an input/output circuit, the processor being configured in response to the computer executable instructions comprising instructions for:
   displaying first object in a first object area of a display for a first period of time wherein the width of the first object area of the display is less than an entire width of the display;
   after an expiration of the first period of time, displaying summary first object in a reduced first object area of the display wherein the width of the first object area and the reduced first object area is the same and wherein the area of the reduced first object area is at least 50% less than the area of the first object area;
   displaying a second object in a second object area for a second period of time wherein the second portion of the display is stacked directly above and connected to the reduced first object area of the display;
   after an expiration of the second period of time, displaying a summary second object in a reduced second object area of the display wherein the reduced second object area of the display is stacked directly above and connected to the reduced first object area and wherein the width of the second object area and the reduced second object area is the same and wherein the area of the reduced second object area is at least 50% less than the area of the second object area;
   displaying the reduced first object area for a third period of time and after the expiration of the third period of time:
      removing the reduced first object area; and
      displaying the second reduced object area where the reduced first object area was displayed; and
   if the first object area, reduced first object area, second object area or reduced second object area is selected, providing additional information related to the object area selected.

15. The computer system of claim 14, wherein the width of the first object area, the reduced size first object area, the second object area, and the reduced size second object area are the same.

16. The computer system of claim 14, wherein providing further information comprises one selected from the group comprising:
   opening a new window using a link in the selected object area;
   displaying addition information related to the selected object area; and
   linking to a site related to the selected object area.

* * * * *